US009070258B1

(12) United States Patent
Ilieva

(10) Patent No.: US 9,070,258 B1
(45) Date of Patent: Jun. 30, 2015

(54) AUTOMATED BINGO CALLER ASSEMBLY

(71) Applicant: Melissa P. Ilieva, Atlanta, GA (US)

(72) Inventor: Melissa P. Ilieva, Atlanta, GA (US)

( * ) Notice: Subject to any disclaimer, the term of this patent is extended or adjusted under 35 U.S.C. 154(b) by 210 days.

(21) Appl. No.: 13/904,173

(22) Filed: May 29, 2013

(51) Int. Cl.
*A63F 13/00* (2014.01)
*G07F 17/32* (2006.01)

(52) U.S. Cl.
CPC .................................... *G07F 17/329* (2013.01)

(58) Field of Classification Search
USPC .............................. 463/19, 29, 36, 37, 39, 42
See application file for complete search history.

(56) References Cited

U.S. PATENT DOCUMENTS

| | | | | |
|---|---|---|---|---|
| 353,631 | A | 11/1886 | Gilman | |
| 475,754 | A | 5/1892 | Clifford et al. | |
| 4,169,601 | A | 10/1979 | Frischmann et al. | |
| 4,312,511 | A | 1/1982 | Jullien | |
| 5,011,156 | A | 4/1991 | LaChance, Jr. et al. | |
| 5,297,802 | A | 3/1994 | Pocock et al. | |
| 6,299,169 | B1 | 10/2001 | Adams et al. | |
| 8,235,388 | B1 * | 8/2012 | Itkis et al. | 273/144 A |
| 8,282,475 | B2 * | 10/2012 | Nguyen et al. | 463/29 |
| 8,568,224 | B1 * | 10/2013 | Itkis et al. | 463/29 |
| 2002/0094860 | A1 * | 7/2002 | Itkis et al. | 463/19 |
| 2003/0054341 | A1 * | 3/2003 | Rice et al. | 435/5 |
| 2007/0167221 | A1 | 7/2007 | Walker et al. | |

* cited by examiner

*Primary Examiner* — James S McClellan

(57) ABSTRACT

An automated Bingo caller assembly includes a remote unit that may be positioned proximate a user. A remote processor is coupled to the remote unit. A remote transceiver is coupled to the remote unit. The remote transceiver selectively transmits a caller signal. An optical disk is provided to store data. A base unit is provided that may read the optical disk. A base processor is coupled to the base unit. A base transceiver is coupled to the base unit. The base transceiver receives the caller signal from the remote transceiver. A display is operationally coupled to the base processor so the display selectively displays the data. A master actuator may be positioned proximate the user. A master transceiver is coupled to the master actuator and operationally coupled to the base transceiver. A card is provided that may be positioned proximate the user. A marker is selectively positionable on the card.

15 Claims, 4 Drawing Sheets

AUTOMATED BINGO CALLER ASSEMBLY

BACKGROUND OF THE DISCLOSURE

Field of the Disclosure

The disclosure relates to automated Bingo caller devices and more particularly pertains to a new automated Bingo caller device for automatically calling Bingo letters and numbers.

SUMMARY OF THE DISCLOSURE

An embodiment of the disclosure meets the needs presented above by generally comprising a remote unit that may be positioned proximate a user. A remote processor is coupled to the remote unit. A remote actuator is coupled to the remote unit. The remote actuator is operationally coupled to the remote processor so the remote actuator selectively actuates the remote processor A remote transceiver is coupled to the remote unit. The remote transceiver is operationally coupled to the remote processor so the remote transceiver selectively transmits a caller signal. An optical disk is provided to store data. A base unit is provided that may read the optical disk. A base processor is coupled to the base unit. A base transceiver is coupled to the base unit. The base transceiver is operationally coupled to the base processor. The base transceiver receives the caller signal from the remote transceiver. A display is operationally coupled to the base processor so the display selectively displays the data. A master actuator may be positioned proximate the user. A master transceiver is coupled to the master actuator. The master transceiver is operationally coupled to the base transceiver. A card is provided that may be positioned proximate the user. A marker is selectively positionable on the card.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
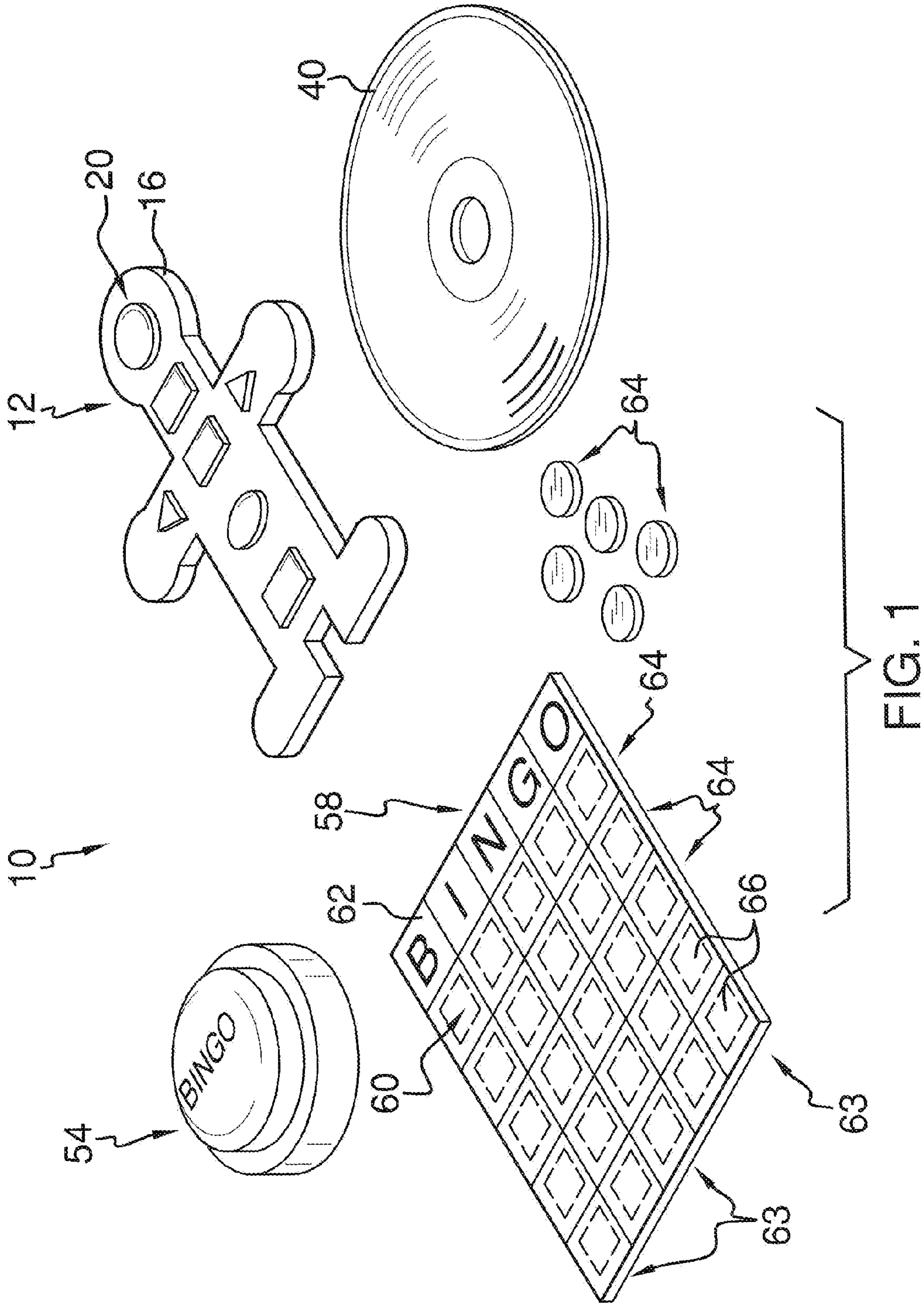
FIG. 1 is a perspective view of a automated Bingo caller assembly according to an embodiment of the disclosure.
Figure 2:
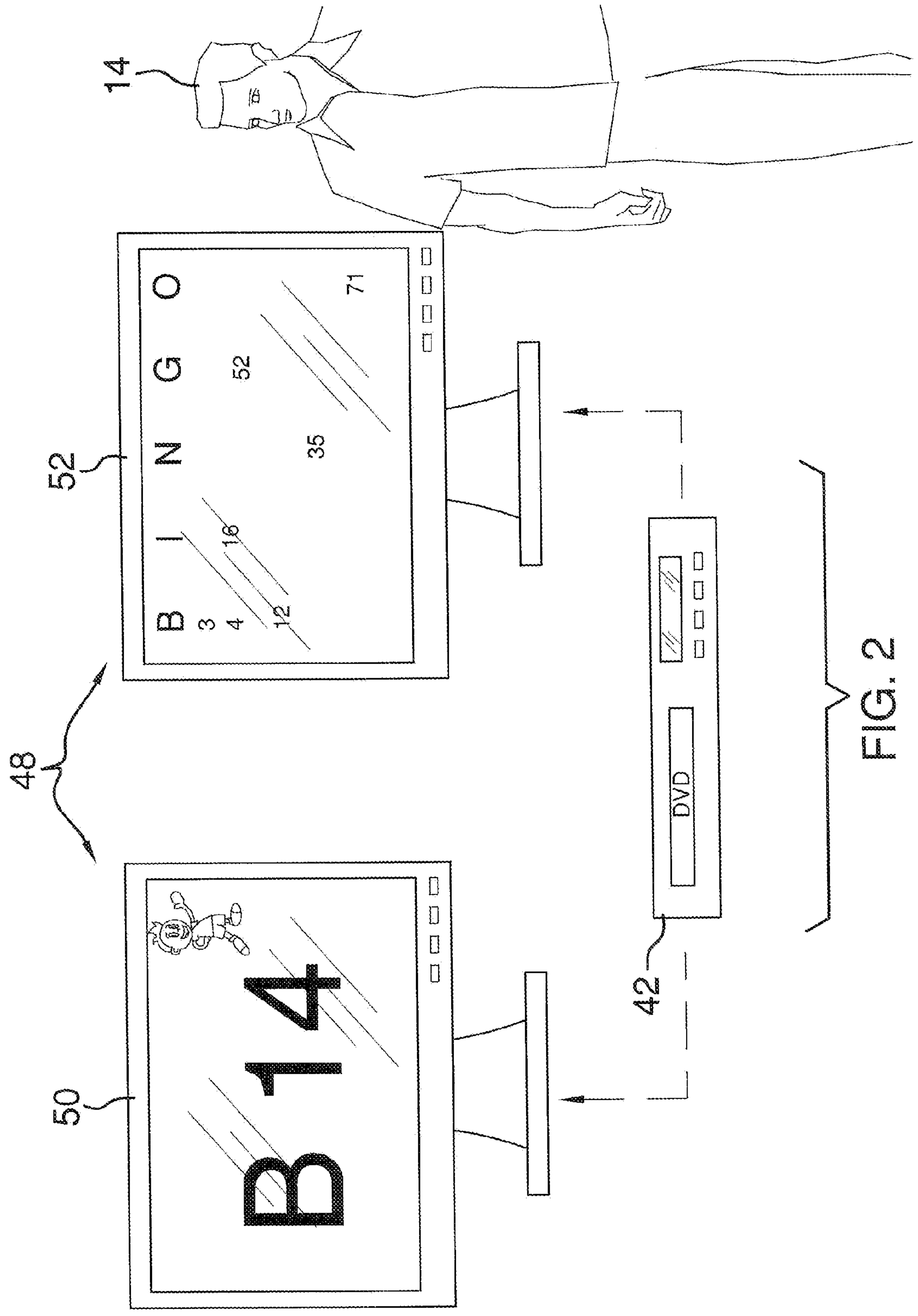
FIG. 2 is front view of an embodiment of the disclosure.
Figure 3:
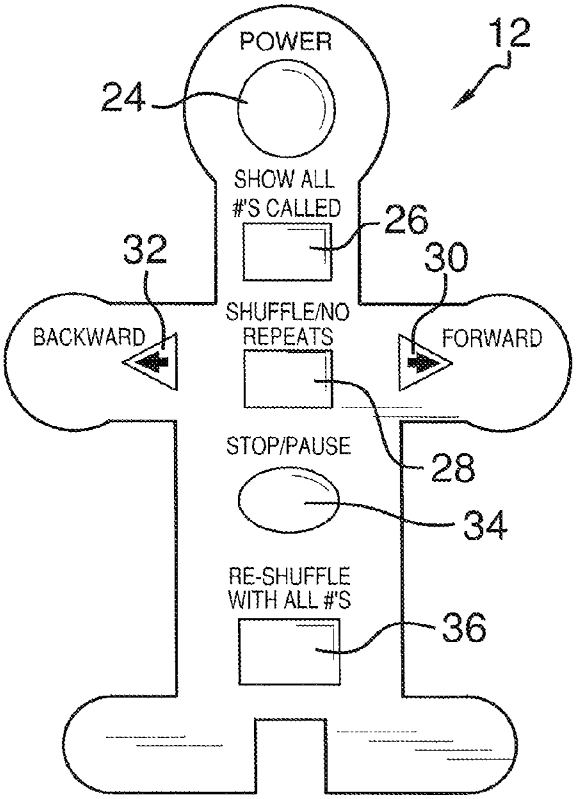
FIG. 3 is a top view of an embodiment of the disclosure.
Figure 4:
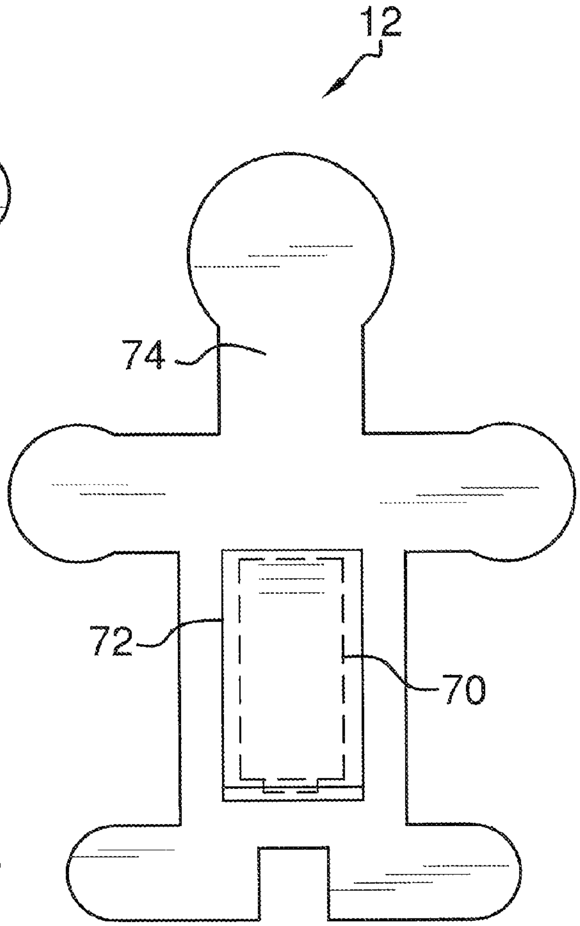
FIG. 4 is a bottom view of an embodiment of the disclosure.
Figure 5:
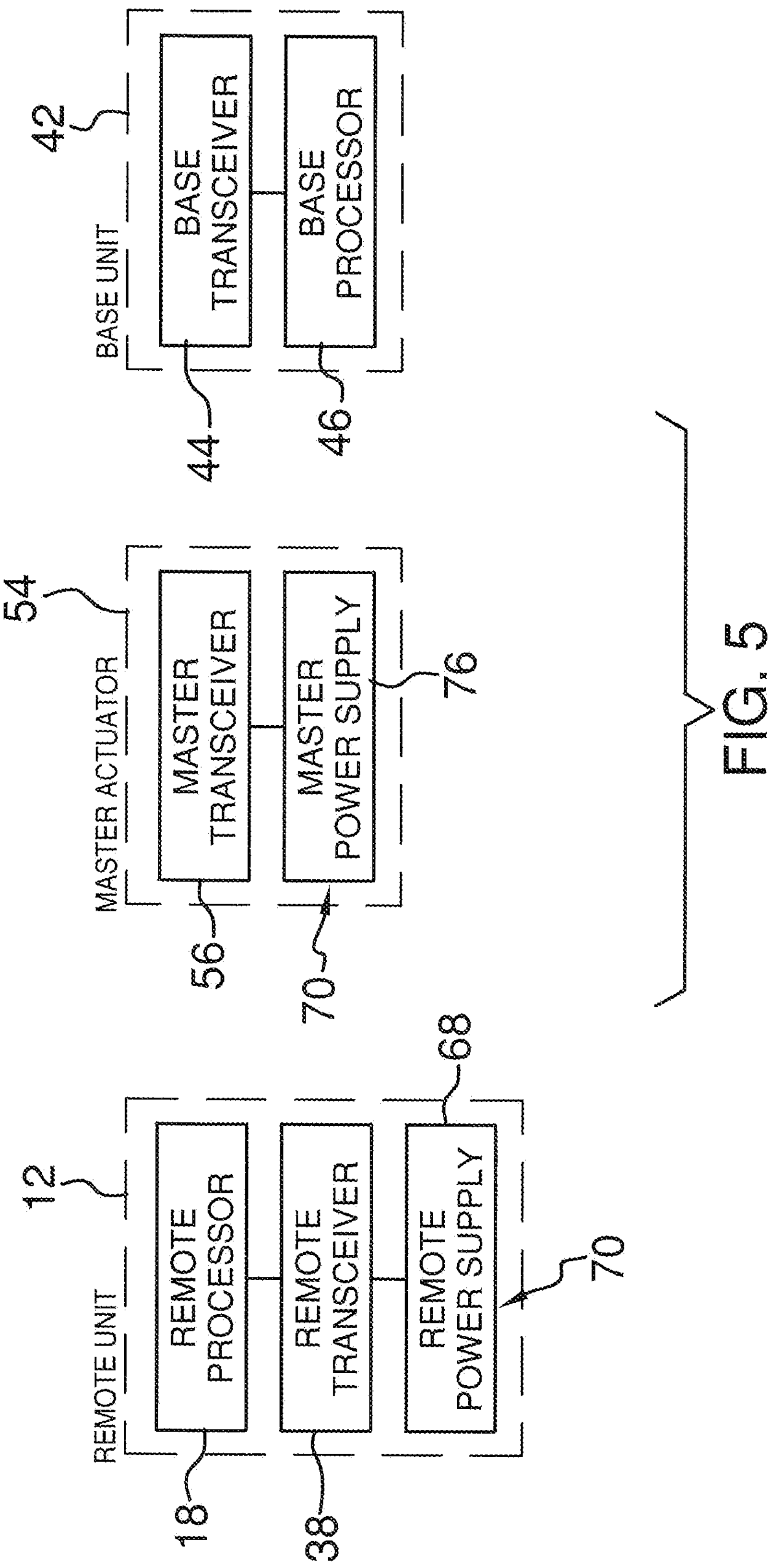
FIG. 5 is a schematic view of an embodiment of the disclosure.

With reference now to the drawings, and in particular to FIGS. 1 through 5 thereof, a new automated Bingo caller device embodying the principles and concepts of an embodiment of the disclosure and generally designated by the reference numeral 10 will be described.

As best illustrated in FIGS. 1 through 5, the automated Bingo caller assembly 10 generally comprises a remote unit 12 that may be positioned proximate a user 14. An outside edge 16 of the remote unit 12 defines a humanoid shape. Further, the remote unit 12 may have a length between 10 cm and 13 cm, and a width between 2.5 cm and 10 cm. A remote processor 18 is coupled to the remote unit. The remote processor 18 is an electronic processor of any conventional design.

A remote actuator 20 is coupled to a top 22 of the remote unit 12. The remote actuator 20 is electrically coupled to the remote processor 18 so the remote actuator 20 may selectively actuate the remote processor 18. Continuing, the remote actuator 20 is selectively actuated by the user 14 so the remote actuator 20 directs a game of Bingo. The remote actuator 20 is one of a plurality of remote actuators 20. In addition, the plurality of remote actuators 20 may comprise a power actuator 24, a show all numbers actuator 26, a shuffle with no repeats actuator 28, a forward actuator 30, a backward actuator 32, a stop/pause actuator 34 and a shuffle all numbers actuator 36.

A remote transceiver 38 is coupled to the remote unit 12. The remote transceiver 38 is electrically coupled to the remote processor 18 so the remote transceiver 38 selectively transmits a caller signal. Additionally, the remote transceiver 38 may comprise a wireless RF transceiver of any conventional design. An optical disk 40 is provided to store data. The data on the disk comprises numbers, letters and audio pertaining to the game of Bingo. The letters, numbers, and audio may come in a plurality of languages. In addition, the optical disk 40 may comprise a DVD of any conventional design.

A base unit 42 is provided to read the optical disk 40. The base unit 42 may be a DVD player of any conventional design. A base processor 44 is coupled to the base unit 42. The base processor 44 continually and randomly generates a non-repeating sequence of combinations of letters and numbers from the data on the optical disk 40. Continuing, a base transceiver 46 is coupled to the base unit 42. The base transceiver 46 is electrically coupled to the base processor 44 and the base transceiver 46 receives the caller signal from the remote transceiver 38. The base unit 42 reads data from optical disk 40 based on the caller signal transmitted from the remote transceiver 38.

A display 48 is provided that is electrically coupled to the base processor 44 so the display 48 may display the randomly generated combinations of letters and numbers for Bingo gameplay. The display 48 may be a television of any conventional design. In addition, the display 48 emits the audio from the optical disk 40 so the user 14 hears the randomly generated combination of letters and numbers. The display 48 may be one of a pair of displays 48. A first one of the displays 50 may display each consecutive randomly generated combination of letters and numbers. A second one of the displays 52 may display a current list of all previously randomly generated combination of letters and numbers.

A master actuator 54 is provided that may be positioned proximate the user 14. A master transceiver 56 is electrically coupled to the master actuator 54. The master actuator 54 is selectively actuated by the user 14 wherein the master transceiver 56 transmits a game over signal to the base transceiver 46. When the base transceiver 46 receives the game over signal the base unit 42 ceases reading the data on the optical disk 40.

A card 58 is provided that may be positioned proximate the user 14. The card 58 comprises indicia 60 printed on a top side 62 of the card 58 and the indicia 60 comprises a plurality of columns 63 and rows 64. The card 58 may be comprised of a flexible and magnetic material. In addition, the card 58 may be a Bingo card of any conventional design. A marker 64 is positionable on a selected one of an intersection 66 of an associated pair of the columns 63 and rows 64 so the marker 64 magnetically engages the card 58. Each of the selected intersections 66 corresponds to the randomly generated combinations of numbers and letters displayed on the display 48. Finally, the marker 64 is one of a plurality of the markers 64.

A remote power supply 68 is coupled to the remote unit 12. The remote power supply 68 is electrically coupled to the remote processor 18. Additionally, the remote power 68 supply comprises at least one battery 70. The battery 70 is positioned beneath a battery cover 72 on a back 74 of the remote unit 12. A master power supply 76 is coupled to the master actuator 54. The master power supply 76 is electrically coupled to the master transceiver 56. Additionally, the master power supply 76 comprises at least one battery 70.

In use, the optical disk 40 is inserted into the base unit 42. As the display 48 begins to display and announce the randomly generated combination of letters and numbers, the user 14 positions a selected one of the plurality of markers 64 on a corresponding intersection 66 on the card 58. The user 14 may actuate the backward actuator 32 on the remote unit 12 to display the previously selected combination of letters and numbers. In addition, the user 14 may actuate the show all show all numbers actuator 26 to display all of the generated combinations of letters and numbers on the display 48. The user 14 may actuate the stop/pause actuator 34 to cease the progress of the game until the stop/pause actuator 34 is actuated again. If the user 14 achieves "Bingo" the user 14 actuates the master actuator 54 to stop the game. The game may be restarted for any selected number of times.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. An automated Bingo caller assembly comprising:

a remote unit configured to be positioned proximate a user;

a remote processor coupled to said remote unit;

a remote actuator coupled to said remote unit, said remote actuator being operationally coupled to said remote processor wherein said remote actuator selectively actuates said remote processor;

a remote transceiver coupled to said remote unit, said remote transceiver being operationally coupled to said remote processor wherein said remote transceiver selectively transmits a caller signal;

an optical disk configured to store data;

a base unit configured to read said optical disk;

a base processor coupled to said base unit;

a base transceiver coupled to said base unit, said base transceiver being operationally coupled to said base processor, said base transceiver receiving the caller signal from said remote transceiver;

a display operationally coupled to said base processor wherein said display selectively displays the data;

a master actuator configured to be positioned proximate the user;

a master transceiver coupled to said master actuator, said master transceiver being operationally coupled to said base transceiver;

a card configured to be positioned proximate the user; and a marker being selectively positionable on said card.

2. The assembly according to claim 1, further comprising said remote actuator being electrically coupled to said remote processor.

3. The assembly according to claim 2, further comprising said remote actuator being selectively actuated by the user wherein said remote actuator directs a game of Bingo.

4. The assembly according to claim 3, further comprising said remote actuator being one of a plurality of said remote actuators.

5. The assembly according to claim 1, further comprising said remote transceiver being electrically coupled to said remote processor.

6. The assembly according to claim 1, further comprising said master transceiver being electrically coupled to said master actuator.

7. The assembly according to claim 1, further comprising said master actuator being selectively actuated by the user wherein said master transceiver transmits a game over signal to said base transceiver.

8. The assembly according to claim 1, further comprising indicia printed on a top side of said card, said indicia comprising a plurality of columns and rows.

9. The assembly according to claim 1, further comprising said marker being positionable on a selected one of an intersection of an associated pair of a column and a row.

10. The assembly according to claim 1, further comprising said marker being one of a plurality of said markers.

11. The assembly according to claim 1, further comprising said base transceiver being electrically coupled to said base processor.

12. The assembly according to claim 1, further comprising said display being electrically coupled to said base processor.

13. The assembly according to claim 1, further comprising:

a remote power supply coupled to said remote unit;

said remote power supply being electrically coupled to said remote processor; and said remote power supply comprising at least one battery.

14. The assembly according to claim 1, further comprising:

a master power supply coupled to said master actuator;

said master power supply being electrically coupled to said master transceiver; and said master power supply comprising at least one battery.

15. An automated Bingo caller assembly comprising:

a remote unit configured to be positioned proximate a user;

a remote processor coupled to said remote unit;

a remote actuator coupled to a top of said remote unit, said remote actuator being electrically coupled to said remote processor wherein said remote actuator selectively actuates said remote processor, said remote actuator being selectively actuated by the user wherein said remote actuator directs a game of Bingo, said remote actuator being one of a plurality of said remote actuators;

a remote transceiver coupled to said remote unit, said remote transceiver being electrically coupled to said remote processor wherein said remote transceiver selectively transmits a caller signal;

an optical disk configured to store data;

a base unit configured to read said optical disk;

a base processor coupled to said base unit;

a base transceiver coupled to said base unit, said base transceiver being electrically coupled to said base processor, said base transceiver receiving the caller signal from said remote transceiver;

a display electrically coupled to said base processor wherein said display selectively displays the data;

a master actuator configured to be positioned proximate the user;

a master transceiver coupled to said master actuator, said master transceiver being electrically coupled to said master actuator, said master actuator being selectively actuated by the user wherein said master transceiver transmits a game over signal to said base transceiver;

a card configured to be positioned proximate the user, said card comprising indicia printed on a top side of said card, said indicia comprising a plurality of columns and rows;

a marker being positionable on a selected one of an intersection of an associated pair of said columns and rows, said marker being one of a plurality of said markers;

a remote power supply coupled to said remote unit, said remote power supply being electrically coupled to said remote processor, said remote power supply comprising at least one battery; and a master power supply coupled to said master actuator, said master power supply being electrically coupled to said master transceiver, said master power supply comprising at least one battery.

* * * * *